United States Patent
Pieralli et al.

(10) Patent No.: US 7,439,876 B2
(45) Date of Patent: Oct. 21, 2008

(54) MICROWAVE DETECTION SYSTEM AND METHOD

(75) Inventors: Moreno Pieralli, Valdarno (IT); Paolo Torassa, Avigliana (IT); Masoud M. Zadeh, Genoa (IT)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 11/421,118

(22) Filed: May 31, 2006

(65) Prior Publication Data

US 2006/0232440 A1    Oct. 19, 2006

Related U.S. Application Data

(63) Continuation-in-part of application No. 11/195,145, filed on Aug. 2, 2005, now Pat. No. 7,295,111.

(60) Provisional application No. 60/753,907, filed on Dec. 23, 2005.

(51) Int. Cl.
    *G08G 1/16* (2006.01)
(52) U.S. Cl. .................. 340/903; 340/435; 246/292
(58) Field of Classification Search ......... 340/901–905, 340/928, 933, 435, 436, 541, 550, 552, 554, 340/561, 565, 945; 246/125, 122 R, 126, 246/292–295, 473.1
    See application file for complete search history.

(56) References Cited

U.S. PATENT DOCUMENTS

| 2,085,798 | A | 7/1937 | Gerhard |
|---|---|---|---|
| 3,243,801 | A | 3/1966 | Bell et al. |
| 3,314,066 | A | 4/1967 | Schwartz et al. |
| 4,727,593 | A | 2/1988 | Goldstein |
| 4,796,012 | A | 1/1989 | Schechter et al. |
| 4,901,575 | A | 2/1990 | Bohannan et al. |
| 4,956,999 | A | 9/1990 | Bohannan et al. |
| 5,198,799 | A | 3/1993 | Pascale |
| 5,233,353 | A | 8/1993 | Guena et al. |
| 5,239,459 | A | 8/1993 | Hunt et al. |

(Continued)

FOREIGN PATENT DOCUMENTS

DE    2501244    7/1976

(Continued)

*Primary Examiner*—George A Bugg
*Assistant Examiner*—Travis R Hunnings
(74) *Attorney, Agent, or Firm*—John Kramer, Esq.; Enrique J. Mora, Esq.; Beusse, Wolter, Sanks, Mora & Maire, P.A.

(57) ABSTRACT

A microwave detection system includes a transmitter configured to transmit a signal along a path to detect an intruder to a monitored zone and a modulating reflector configured to receive the transmitted signal to generate a modulated signal having a characteristic introduced by said modulating reflector, the modulating reflector being configured to transmit the modulated signal. The system also includes a receiver located to receive the modulated signal and an adaptive threshold adjustment unit configured for providing a variable detection threshold responsive to a change in a gain of the system. The system further includes a processor configured for processing the modulated signal provided by the receiver and configured for measuring a characteristic in the processed modulated signal with respect to the variable detection threshold provided by the adaptive threshold adjustment unit.

23 Claims, 12 Drawing Sheets

U.S. PATENT DOCUMENTS

| | | |
|---|---|---|
| 5,530,429 A | 6/1996 | Hablov et al. |
| 5,625,340 A | 4/1997 | Gustavsson |
| 5,631,875 A | 5/1997 | Romes et al. |
| 5,680,136 A | 10/1997 | Chekroun |
| 5,774,045 A * | 6/1998 | Helma et al. ............... 340/436 |
| 5,890,682 A * | 4/1999 | Welk ......................... 246/125 |
| 5,977,913 A | 11/1999 | Christ |
| 6,129,025 A | 10/2000 | Minakami et al. |
| 6,267,332 B1 | 7/2001 | Almblad |
| 6,340,139 B1 * | 1/2002 | Hilleary ..................... 246/292 |
| 6,492,933 B1 * | 12/2002 | McEwan ..................... 342/28 |
| 6,933,858 B2 | 8/2005 | Pieralli |
| 2002/0196155 A1 | 12/2002 | McNulty, Jr. |

FOREIGN PATENT DOCUMENTS

| | | |
|---|---|---|
| EP | 0971242 | 12/2000 |
| WO | WO 93/15416 A1 | 8/1993 |
| WO | WO 97/07005 A1 | 2/1997 |

* cited by examiner

MICROWAVE DETECTION SYSTEM AND METHOD

SPECIFIC DATA RELATED TO THE INVENTION

This is a continuation-in-part of U.S. non-provisional patent application Ser. No. 11/195,145, filed Aug. 2, 2005 now U.S. Pat. No. 7,295,111, which in turn claims priority from U.S. non-provisional patent application Ser. No. 10/647,413, filed Aug. 25, 2003, now issued as U.S. Pat. No. 6,933,858, which in turn claims priority from U.S. provisional patent application No. 60/405,490, filed Aug. 23, 2002, each of which is incorporated by reference herein in its entirety.

This application also claims the benefit of U.S. provisional application Ser. No. 60/753,907, filed Dec. 23, 2005, which is incorporated by reference herein in its entirety.

FIELD OF THE INVENTION

The invention relates generally to a microwave detection system. More particularly, the invention relates to a system and method for automatically detecting intrusion in an off-limits zone.

BACKGROUND OF THE INVENTION

FIG. 1 illustrates a typical prior art railroad grade crossing 100 with a single railroad track 102. A first gate 104A and 104B is closed when a train approaches on track 102 thereby restricting the flow of traffic from the corresponding side of track 102. A second gate 106A and 106B is closed on the opposite side of track 102 from gates 104A and 104B to restrict the flow of traffic from the opposite side.

In FIG. 2, a similar prior art railroad grade crossing 200 is shown but with two tracks 202 and 204 shown as the grade crossing 200. Similar to shown above for the single track configuration 100, a first gate 206A and 206B is closed when a train approaches on track 202 or 204 thereby restricting the flow of traffic from that side of track 102. A second gate 208A and 208B is closed on the opposite side of tracks 202 and 204 from gates 206A and 206B to restrict the flow of traffic from the opposite side.

In these prior art systems, the gates close when an approaching train is detected. In order to detect obstacles located between closed gates in the proximity of the tracks, some prior art systems rely on a transmitter/receiving system that is responsive to reflections of the transmitted signals by the obstacles themselves and do not utilize a reflector or detect the presence of a signal from the reflector. See U.S. Pat. No. 6,340,139 and U.S. Pat. No. 5,625,340.

Other prior art systems rely on reflectors that reflect frequency-modulated radar which utilize the frequency and amplitude differences between the transmitted and reflected signal to determine the presence of an object in the surveillance zone. These prior art systems detect differences in signal amplitude and the signal phase. The latter results from a phase shift determined by the signal transit time as defined by a transit time component at the reflector. However, in this known implementation, the system includes a receiver, circulator, transit time element, a directional separating filter, and an amplifier, each of which incrementally adds to the complexity and cost of the system. See U.S. Pat. No. 5,775,045.

Several systems have been developed which utilize microwave detection systems. However, prior art systems currently encounter problems such as false detection of obstacles, inaccurate detection of obstacles, failure to detect obstacles, detection of echoes, inadequate surveillance, and high cost associated with the initial installation and with ongoing operations.

BRIEF DESCRIPTION OF THE DRAWINGS

Corresponding reference characters and designations generally indicate corresponding parts throughout the drawings.

DETAILED DESCRIPTION

Aspects of the present invention are directed to a microwave detection system, such as may be used for automatically detecting intrusion to an off-limits zone using a modulated microwave signal. The description below will first describe one embodiment such as may be used for automatically detecting the presence of obstacles within the zone of a railroad track grade crossing. The description will then describe another embodiment such as may be used for automatically detecting intrusion through one or more perimeters that define an off-limits zone, such as may used at an airport.

Figure 1:
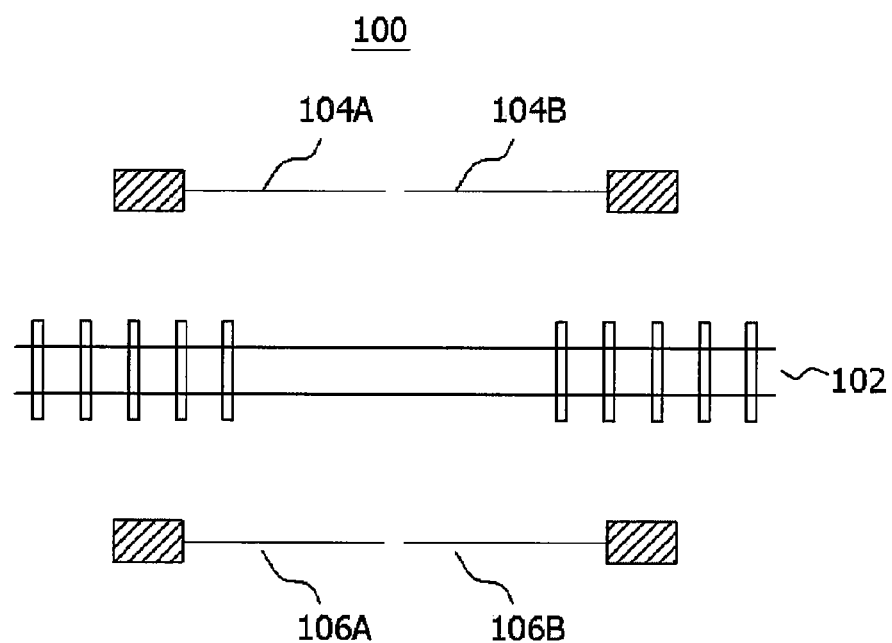
FIG. 1 is an illustration of a prior art railroad grade crossing for a single track crossing.
Figure 2:
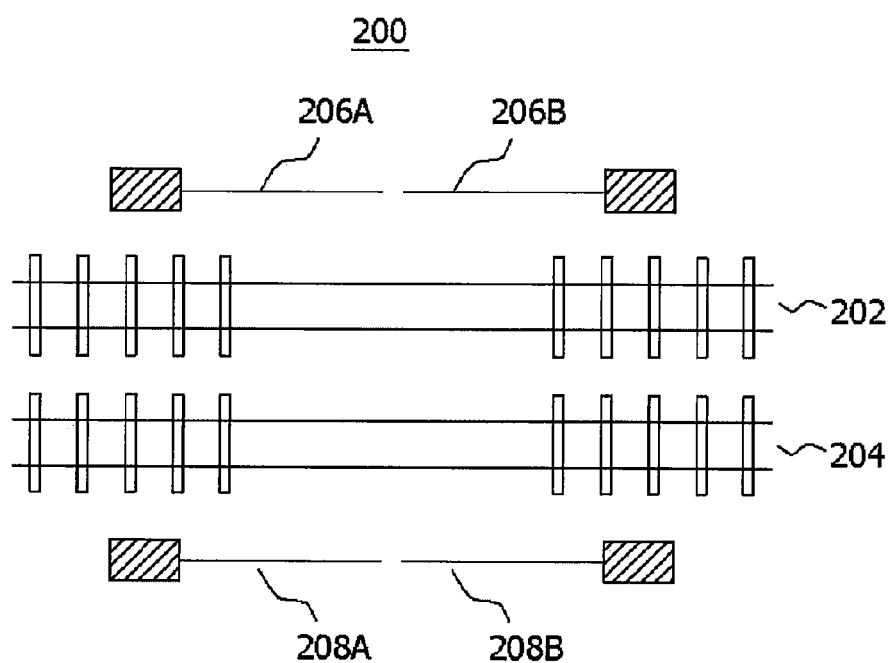
FIG. 2 is an illustration of a prior art railroad grade crossing for a two track crossing.
Figure 3:
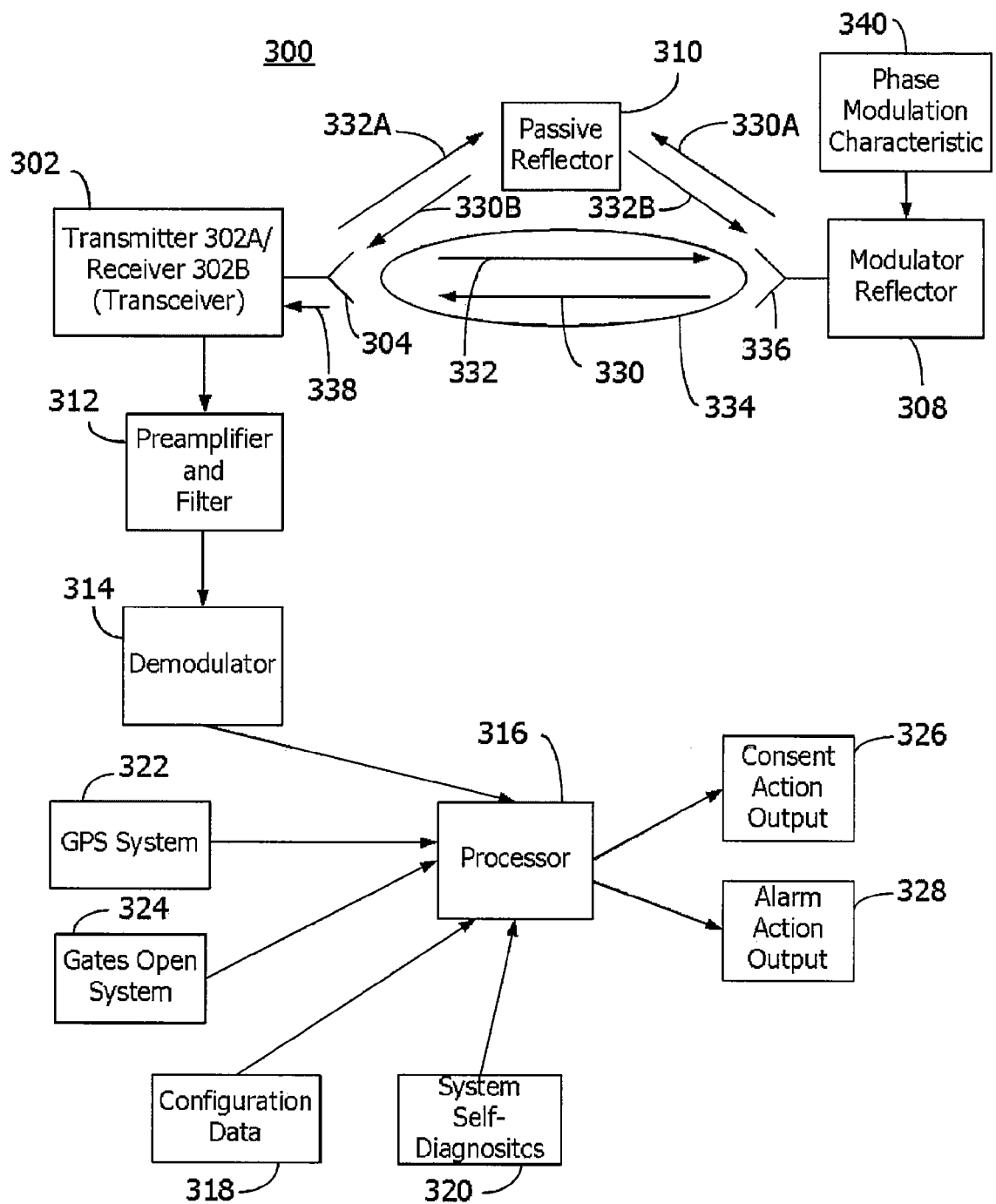
FIG. 3 is a schematic illustrating a microwave detection system for automatically detecting intrusion in an off-limits zone in accordance with aspects of the invention.

FIG. 3 is a simplified block diagram of one embodiment of a system 300 for automatically detecting intrusion in an off-limits zone, such as detecting the presence of an obstacle within the zone of a railroad track grade crossing using a microwave transmitter/receiver 302 and a modulating reflector 308. Transmitter/receiver 302 is equipped with an antenna 304. As shown, transmitter/receiver 302 may be a combined transceiver 302, or may be a separate transmitter 302A and a separate receiver 302B. In such a latter case, transmitter 302A and receiver 302B may each be equipped with an antenna 304. Transceiver 302 provides received signal 338 to a preamplifier 312 that provides a processed signal to a demodulator 314. Demodulator 314 provides a demodulated received signal 338 to a processor 316 for signal analysis.

Processor 316 may be a single processor, or may in another embodiment be configured as a multiple processor 316. In one embodiment, processor 316 is a dual-processor 316 configuration. Processor 316 may be comprised of a memory (not shown), hardware, software and/or firmware. The functions described with regard to processor 316 may be configured and performed by one or more of software, firmware, or hardware.

Transmitted signal 332 is transmitted by transmitter 302A and received by one or more modulating reflectors (MDR) 308. Modulating reflector 308 receives transmitted signal 332 and introduces a characteristic to create modulated signal 330. Modulated signal 330 is transmitted or reflected by modulating reflector 308 and is received by receiver 302B. System 300 provides enhanced definition of surveillance zone 334 as defined by transceiver 302 and a modulating reflector 308 and associated transmitted signal 332 and modulated signal 330. Transmitted signal 332 and modulated signal 330 define surveillance zone 334 such that the detection of an obstruction in surveillance zone 334 is a function of the disruption of either the transmitted signal 332 or modulated signal 330 as will be further discussed below.

In one embodiment, transceiver 302 operates in band X at a frequency of 9.2 GHz to 10.6 GHz, e.g., 10.0 GHz with a 22.0 MHz FM sweep/bandwidth. In one embodiment, this is a continuous-wave microwave signal. The power of transmitter 302A may be in the range of 10 mW, plus or minus 1 mW. Other power levels of transmitter 302A may be in the range of 20 mW, plus or minus 2 mW. Receiver 302B may be, in one embodiment, the originating site which is transceiver 302. In another embodiment, receiver 302B may be separate from transmitter 302A. In yet another embodiment, dual receivers 302B may be used wherein their received signals 338 are combined and the combined signal is analyzed. This later embodiment may be applicable where the frequency of transmitted signal 332 may result in a null signal such as results from phase shifts or other signal patterns that result in the transmitted signal 332 negatively affecting the modulated signal 330, thereby negatively affecting the ability to detect modulating signal 330 and any characteristic introduced by the modulating reflector 308.

In another embodiment, transceiver 302 transmits a frequency modulated transmitted signal 332 rather than a continuous or single frequency signal. In such an embodiment, frequency modulation with a bandwidth between 5.0 and 25.0 MHz may be introduced in transmitter 302A. By introducing frequency modulation into transmitted signal 332, the frequency of unwanted amplitude modulation is increased to a level that enables improved detection of a peak of received signal 338 and/or the sidebands in received signal 338.

In one embodiment, antenna 304 may be a directional antenna that provides for the formation of transmitted signal 332 such as to define surveillance zone 334. The selection of the type of transceiver antenna 304 is dependent on the shape of the desired surveillance zone 334, the intended distance required for surveillance of surveillance zone 334, and the frequency of transmitted signal 332. For instance, a parabolic antenna may provide a beam angle of 5 degrees whereas a horn antenna may provide a beam angle of 30 degrees. In addition, in one embodiment, transceiver antenna 304 may have a TX/RX Ø=35 cm.

Modulating reflector 308 is responsive to transmitted signal 332. Modulating reflector 308 may comprise or include a modulating reflector antenna 336. In one embodiment, modulating reflector 308 is a modulating horn reflector with a horn reflector size of 12.5×9.5×15 cm. In another embodiment, modulating reflector 308 is a pyramidal horn reflector resulting in a maximum distance between modulating reflector 308 and transceiver antenna 304 of 100 meters. In yet another embodiment, modulating reflector 308 is a parabolic reflector that provides for a maximum distance between modulating reflector 308 and transceiver antenna 304 of 200 meters.

In another embodiment as shown in FIG. 3, a passive reflector 310 is positioned to receive transmitted signal 332A from transmitter 302A, and passively reflect transmitted signal 332B to modulating reflector 308. Additionally, passive reflector 310 may be positioned to receive modulated signal 330A from modulating reflector 308 and to passively redirect modulated signal 330B to receiver 302B. By positioning passive reflector 310, surveillance zone 334 may be shaped, expanded, or designed to particular railroad crossing applications and designs to more effectively monitor the desired surveillance zone 334 for obstructions. Passive reflector 310 may also be used to form two segments of transmitted signal 332 that define two separate surveillance zones 334. For example, in one embodiment, passive reflector 310 defines a second surveillance zone 334 that is at an angle of up to 60 degrees from the first surveillance zone 334. In other embodiments, the angle between the two surveillance zones 334 created by passive reflector 310 may be greater than 60 degrees. In such embodiments, the reflected energy is reduced and thereby the zone defined by the transmitted signal 332 and the modulated signal 330 is reduced. However, by using passive reflector 310 with an angle less than or equal to 60 degrees, the total surveillance zone 334 covered by transmitted signal 332 and modulated signal 330 may be expanded to survey more complex zones and to provide more complete surveillance coverage.

The selection of the transceiver antenna 304 and modulating reflector antenna 336 defines the size of surveillance zone 334 including a distance (or length) between transceiver 302 and modulating reflector 308. In one embodiment where transceiver antenna 304 is a horn antenna and modulating reflector antenna 336 is a horn, the distance between antennas 304 and 336 to define surveillance zone 334 is between 10 and 28 meters. In another embodiment where transceiver antenna 304 is a horn antenna and modulating reflector antenna 336 is a parabola, the distance is between 18 and 28 meters. In yet another embodiment where transceiver antenna 304 is a parabola antenna and modulating reflector antenna 336 is a parabola, the distance is between 28 and 60 meters. Similarly, when passive reflector 310 is included in the system. In one embodiment where transceiver antenna 304 is a horn antenna and modulating reflector antenna 336 is a parabola, the distance is between 10 and 25 meters. In another embodiment where transceiver antenna 304 is a parabola antenna and modulating reflector antenna 336 is a parabola, the distance is between 25 and 50 meters.

In one embodiment, modulating reflector 308 receives transmitted signal 332. Modulating reflector 308 modulates the received transmitted signal 332 and re-transmits modulated signal 330 with a modulation characteristic 340 by reflection to receiver 302B. In one exemplary embodiment, the modulation characteristic may be a phase modulation. It will be appreciated, however, that any modulating technique may be used for imparting a modulation characteristic to the signal 330. Illustrative examples of analog and digital modulation techniques that may be utilized include the following: amplitude modulation (am), frequency modulation (fm), pulse modulation (pm), pulse-code modulation (pcm), differential pulse coded modulation (dpcm), delta modulation (dm), continuously variable slope delta modulation (cvsd), minimum shift keying (msk), etc. Modulating reflector 308 may be a passive device or may be an active device. In one exemplary embodiment, modulating reflector 308 produces modulated signal 330 by introducing characteristic 340, such as a phase modulation, to received transmitted signal 332 with a phase modulation of between 0° and 180° at a frequency of around 10.0 KHz. The modulation frequency may be at 4.0 KHz, 4.7 KHz, 5.7 KHz, 6.7 KHz, 9.0 KHz, or 12.0 KHz. Other frequencies for the phase modulation in the range of 4.0 KHz to 13.0 KHz may also be used. In yet another embodiment, modulating reflector 308 is a multiphase or continuous phase shift-modulating reflector with eight (8) or more different phases. Such an embodiment may be beneficial in eliminating unwanted amplitude modulation of modulated signal 330.

The modulation by modulating reflector 308 results in one or more uniquely identifiable characteristics 340 in modulated signal 330 which provide for the detection of obstacles. For example, frequency or phase modulation may create sidebands in the modulation signal 330 that are not present in the transmitted signal 332, e.g., the transmitted carrier signal. The amplitude, energy, frequency, or number sidebands may define various embodiments the characteristic.

Receiver 302B is responsive to signals in the frequency range of transmitted signal 332 and modulated signal 330. Received signal 338 as received by receiver 302B may or may not contain characteristic 340 as introduced by modulating reflector 308. Received signal 338 is converted into base band using a portion of the carrier signal from transmitter 302A in transceiver 302. Preamplifier and filter 312 amplifies and filters received signal 338 and passes the conditioned received signal 338 to demodulator 314. Received signal 338 is demodulated by demodulator 314 to process received signal 338 for signal analysis by processor 316 for analysis of the amount of characteristic 340 as introduced by modulating reflector 308. This amount can be indicative of an obstacle in surveillance zone 334.

In the transceiver 302, transmitted signal 332 or the carrier components thereof is mixed with received signal 338 wherein in one exemplary embodiment the carrier signal is canceled thereby leaving the sidebands for analysis by processor 316. The sidebands may be analyzed for determination of the desired characteristic 340 and thereby the presence or absence of an object in surveillance zone 334.

In one exemplary embodiment, the signal analysis process by processor 316 includes detecting and comparing the amount of energy in the sidebands of received signal 338, such as represented by the amplitude of the peak of the sideband. Received signal 338 is filtered by preamplifier filter 312 to remove echoes that may be due to Doppler effects from moving objects. After such filtering, received signal 338 only includes, in the absence of an object in surveillance zone 334, characteristic 340 as introduced by modulating reflector 308. In one exemplary embodiment, the modulation frequency is selected at a frequency that is higher than Doppler-effect frequencies that result from an object moving in surveillance zone 334. As noted above, frequencies of 4 KHz, 4.7 KHz, 5.7 KHz, or 6.7 KHz may be used when a carrier frequency of transmitted signal 332 of 10 GHz is used.

As noted in the example given above, the desired characteristic 340 may be a specific amplitude, frequency, and/or phase of the sidebands contained in received signal 338. The received signal and its sidebands may be analyzed and compared against predefined values, thresholds, or models. For example, if the received signal has a sideband with amplitude peak or energy level that exceeds a predefined value, processor 316 may determine that an obstacle is not present in surveillance zone 334. However, if the amplitude peak of the sideband of the received signal is below the predefined value or threshold, then processor 316 would determine that an obstacle is within surveillance zone 334. In one embodiment, it may be determined that a decrease of more than 3 dB in the peak amplitude of the first sideband indicates that an object is in surveillance zone 334.

The amount of energy in the sidebands of the sidebands in received signal 338 may also be utilized to determine the presence or absence of an object. If the determined energy level is found to be below a predetermined level, processor 316 may determine that an object is present in surveillance zone 334. In one embodiment, the system may detect and determine the amount of total energy in the first, second, and third sidebands of received signal 338. The total energy level of such sidebands is compared to a predetermined energy level. In one embodiment, when the total energy level is 80 percent of the normal level, e.g., a reduction of 20 percent, processor 316 determines that an obstacle is present in surveillance zone 334. In other embodiments, the one or more sidebands may be analyzed and/or the deviation may range from 5 percent to 50 percent for the energy or peak amplitude of the sidebands.

In one exemplary embodiment, the predetermined comparison levels for peak amplitude or energy level detection are established during product development, product design, and/or product deployment based on testing and operation, and are dependent on the transmitted frequency. In some embodiments, system 300 includes a variable input function (not shown) that enables an operator to adjust the sensitivity or threshold levels of processor 316 used to determine whether received signal 338 contains the desired characteristic 340 and thereby determine whether or not an object is detected within surveillance zone 334.

If received signal 338 contains the desired amount of characteristic 340 as introduced by modulating reflector 308 as described above, system 300 provides an indication that surveillance zone 334 is free of obstacles. The presence of desired amount of characteristic 340 as generated by modulating reflector 308 indicates that received signal 338 is that which was originally transmitted as transmitted signal 332, modulated by modulating reflector 308, and re-transmitted as modulated signal 330 with characteristic 340. The receipt of the desired amount of characteristic 340 in modulated signal 330 also ensures that improper or false signals that are received do not provide a false indication that surveillance zone 334 is clear.

In an alternative embodiment, system 300 may be comprised of two or more transceivers 302 each operating at a separate frequency. In this embodiment, it may be viewed as having two separate received signals 338 being received by receiver 302B, or that one received signal 338 is received, but the received signal 338 having more than one signal component. In one view two transmitted signals 332 are transmitted two transceivers 302, and two modulated signals 330 with two characteristics 340 are generated by modulating reflector 308. In either case, the signal conditioning, demodulation, and analysis process described above is applied with regard to each received signal 338. The determination by processor 316 with regard to the presence of an object in surveillance zone 334 is determined by a combination of the signal analysis for each of received signals 338.

In another exemplary embodiment, transceiver 302 separately detects a plurality of modulated signals 330 and characteristics 340 from a plurality of modulating reflectors 308. In such an embodiment, each modulating reflector 308 may be tuned to frequency or phase modulate transmitted signal 332 at a unique and separate modulated frequency. Each receiver 302B is tuned to demodulate the signal to determine the characteristics 340, thereby determining the presence of obstacles in each of the defined surveillance zones 334. In such an arrangement, each set of transmitters 302A, modulating reflectors 308, and receivers 302B, define separate surveillance zones 334 that may include multiple paths as defined by the zones between each set of communicating transmitters 302A, modulating reflectors 308, and receivers 302B. For example, see FIG. 9.

In another exemplary embodiment, a GPS system 322 receives data signals from a Global Positioning Satellite (GPS) system (not shown). In this embodiment, system 300 receives and stores in a memory (not shown) the time and/or synchronization signals from the received GPS data. Processor 316 may utilize received GPS data to enhance the reporting, administration, and/or diagnostics capabilities of system 300.

In operation, the surveillance operation of system 300 is initiated when a gates closing signal is received from the crossing gate system 324 indicating that the gates have closed. Upon receipt of the gate closing signal, system 300 begins to transmit transmitted signal 332 and to receive received signal 338 to monitor surveillance zone 334 for obstacles in the crossing after the closing of the gates. In one embodiment, system 300 discontinues checking the crossing or surveillance zone 334 after the activation of the track open signal. In another embodiment, system 300 continues to survey the surveillance zone 334 if the surveillance zone 334 is not interrupted by an expected obstruction such as a passing railway vehicle.

When no obstruction is detected, system 300 generates a consent action 326 that in one embodiment is an initiation of a relay that is energized by processor 316. When an obstacle is detected in the crossing zone or surveillance zone 334, an open zone indication is not generated and further action is taken. In one such embodiment, an alarm action 328 is initiated by processor 316 such as the energizing of an alarm relay. In another exemplary embodiment, the event or action data is stored in a memory (not shown) so that the data events can be analyzed at a later time or by a remote administration system (not shown).

In another exemplary embodiment, processor 316 is configured to provide one or more operational functions. These include receiving information relative to the lowering or rising of the gates for the gates open system 324. Processor 316 may initiate the transmission of transmitted signal 332 by transmitter 302A when receiving information or a gates closing signal from gates open system 324 indicating that the gates have been lowered. When demodulator 314 has received the processed received signal 338, processor 316 analyzes the received signal for characteristic 340. When processor 316 determines from received signal 338 the desired amount of characteristic 340 as described above, processor 316 may generate consent signal 326. When processor 316 determines that received signal 338 does not contain the desired amount of characteristic 340 and therefore determines that an obstacle is present in surveillance zone 334, processor 316 generates the occupied zone alarm 328.

In other exemplary embodiments, processor 316 optionally acquires and verifies the integrity of the internal components of system 300. Processor 316 may also initiate and provide self-diagnosis and check on efficiencies of operations of all system components (see 320) including providing automatic self-test of transmitters 302A and receivers 302B. Processor 316 may also provide for administration and management of various inputs and outputs to system 300 such as communication ports/links (not shown) including the acquisition of the time reference signal from GPS system 322. Processor 316 also may manage an anti-intrusion sensor associated with system 300 equipment cabinets containing transmitter 302A, receiver 302B, modulating reflector 308, passive reflector 310, and other system equipment. Processor 316 may also provide a system failure alarm either as a local alarm or to a remote administrative entity or system (not shown). Processor 316, in conjunction with a memory (not shown), may record or store the actions or events as determined by processor 316 and generate the communication of such events, actions, and status to remote sites, systems, or entities.

Figure 4:
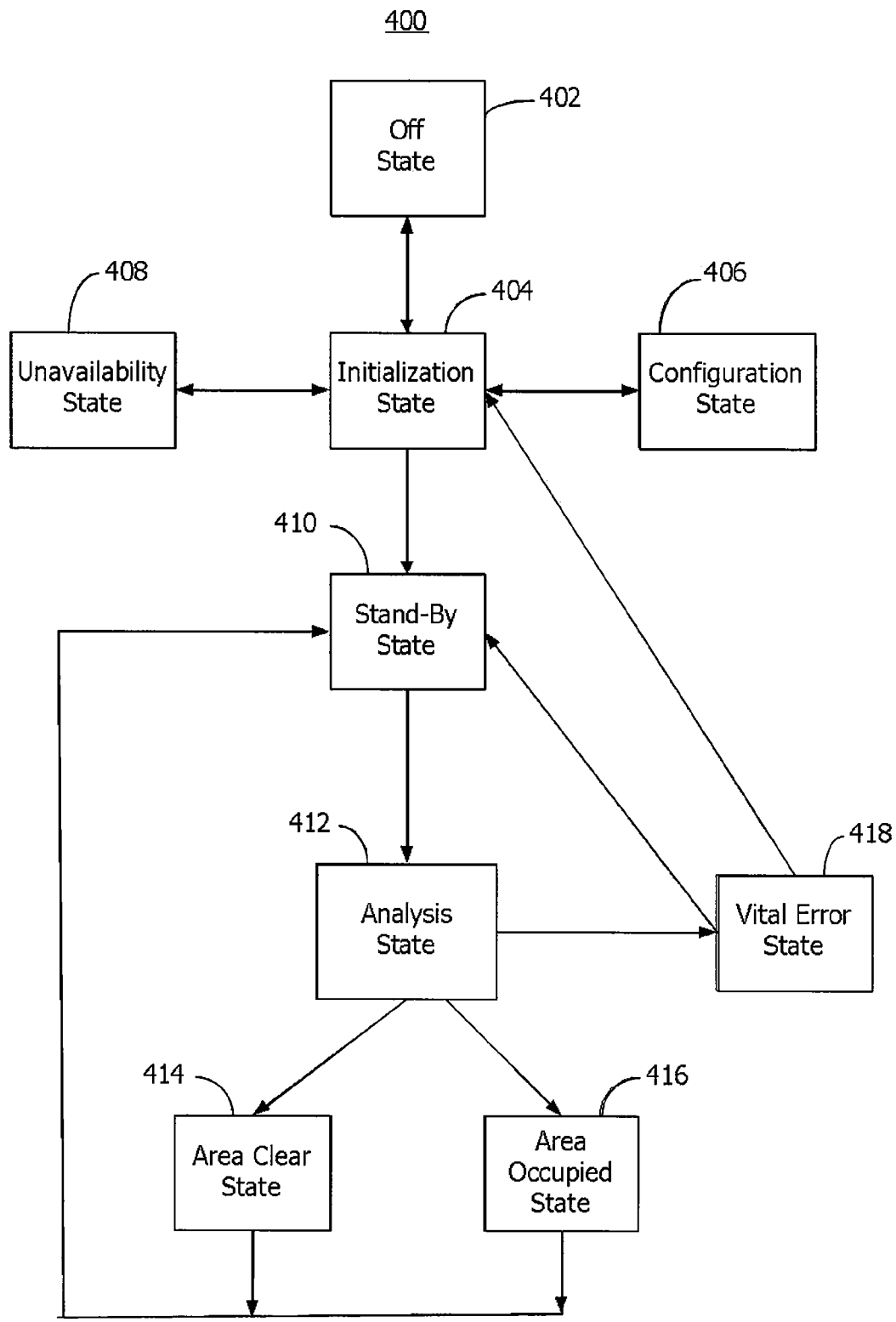
FIG. 4 is a diagram exemplary illustrating exemplary control states for a system for detecting intrusion in an off-limits zone.

In FIG. 4, operating states of one embodiment of the invention are illustrated. The first state is a system off state 402. When power is initially provided to system 300, processor 316 shifts to an initialization state 404. In this state, processor 316 verifies its configuration and operating status. If the configuration is not present, processor 316 shifts to a configuration state 406 to obtain configuration information or data from an external source. In one embodiment, this information could be obtained from a remote administration system via a communication link (not shown). If correct configuration data is present, processor 316 controls the presence of repetitive errors that occurred before the last reset of processor 316. If an error exists, then processor 316 shifts to unavailability state 408 and waits for an external command via a communication link to restart surveillance by system 300. If there is an error in the system, processor 316 may also shift to unavailability state 408, and an alarm or notification is made to an external system or administration system indicating the need for repair. In another embodiment, unavailability state 408 may automatically initiate a system restart (not shown).

If processor 316 passes the tests and configuration diagnostics of initialization state 404, processor 316 shifts to a stand-by state 410. In this state, the system is operational and is awaiting an external indication to enter an analysis state 412. During stand-by state 410, the system is operating correctly without any errors and is awaiting the "gates closed" signal. Processor 316 monitors the safety and self-diagnostics of the system for changes to the systems operability. Processor 316 updates the time and synchronization data received from GPS system 322. The external indication to enter analysis state 412, in one embodiment, is the receipt from an external source that the gates of the railroad grade crossing have been lowered. Additionally, during stand-by state 410, processor 316 receives information from Global Positioning Satellite (GPS) receiver system 322. This information may include any of the available GPS satellite provided information. In one embodiment, this information includes time and/or synchronization information. Once the system receives an activation signal such as the gates closing signal, processor 316 shifts from stand-by state 410 to analysis state 412.

In analysis state 412, processor 316 sets a timer and initiates a transmission of transmitted signal 332 from transmitter 302. In one embodiment, the timer is set for 5 seconds. The system receives signals from receiver 302 that are analyzed to determine the characteristic 340 as introduced by modulating reflector 308 as described above. If the modulated signal 330 containing the desired amount of characteristic 340 is received by receiver 302 and continues to be received by receiver 302 as described above until the timer terminates, processor 316 determines that surveillance zone 334 is clear of obstacles. When this occurs, processor 316 shifts to a zone clear state 414. Zone clear state 414 initiates the consent action 326 and, after receiving a signal indicating the gates have been opened (not shown), processor 316 is returned to stand-by state 410. In one exemplary embodiment, consent action 326 is the setting of an "all clear" relay but may be other actions including the sending of a message to a remote site or system via a communication link (not shown).

Processor 316 analyzes the received signal 338 from receiver 302 and determines the presence of an obstruction in surveillance zone 334. In one exemplary embodiment, once an obstruction is determined (as described above) during the period of the timer, the system shifts to a zone occupied state 416. In zone occupied state 416, received signal 338 continues to be monitored to determine whether the obstacle continues to be located in surveillance zone 334 or whether the obstacle has moved out of surveillance zone 334 and the zone is no longer obstructed. If this is determined and the timer has expired, the system shifts to zone clear state 414. If the obstacle is determined by processor 316 to be moving within surveillance zone 334 (as will be discussed below), the system continues to monitor for the presence of the obstacle. To determine this, filter algorithms are used in conjunction with repeated scanning of surveillance zone 334. If after a defined period of time, which in one embodiment may be the period of the timer, then zone occupied state 416 initiates alarm action 328. In one embodiment, alarm action 328 may be the activation of an alarm relay (not shown). In another embodiment, alarm action 328 may be other actions including the sending of an alarm message to a remote site or system via the communication link (not shown).

If during analysis state 410, zone occupied state 416, or zone clear state 414, processor 316 receives a signal that the gates are no longer closed, processor 316 de-energizes any consent or alarm actions and returns the system to stand-by state 410.

If during stand-by state 410, analysis state 412, zone clear state 414, or zone occupied state 416, an error is detected or occurs in the system or in the operation of the system, the system shifts to a vital error state 418. Whenever the self-diagnostics of the system identifies a failure of transmitter 302A or receiver 302B, system components, or control logic or software operated by processor 316, the system also shifts to the vital error state 418. In vital error state 418, the diagnostic error is logged into a memory (not shown) and a system restart (not shown) may be initiated. In another embodiment, the system shifts to initialization state 404 for further analysis or system restart (not shown).

Figure 5A:
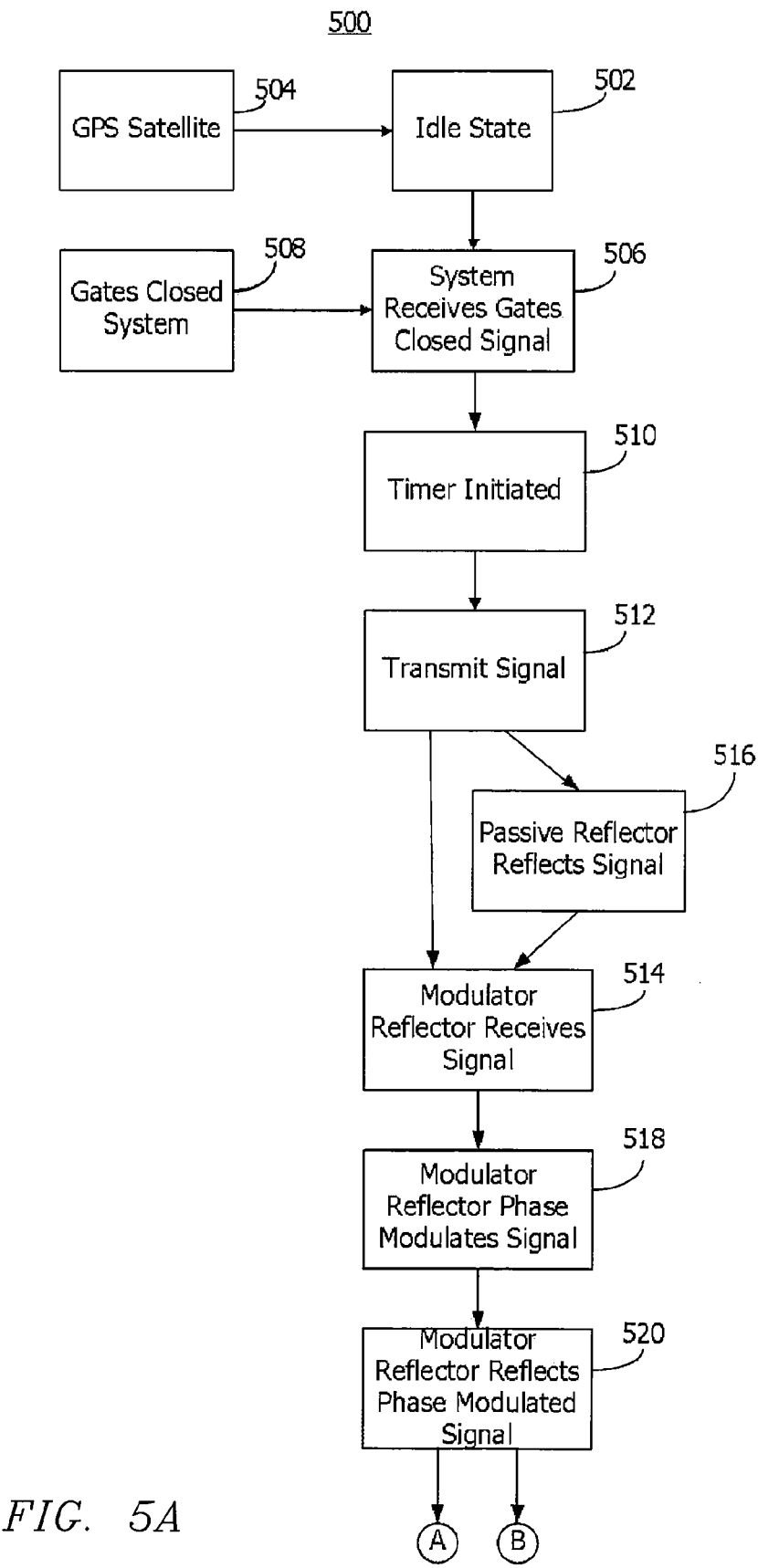
FIG. 5 is a diagram illustrating exemplary steps in a logic flow for a system for detecting intrusion in an off-limits zone.
Figure 5B:
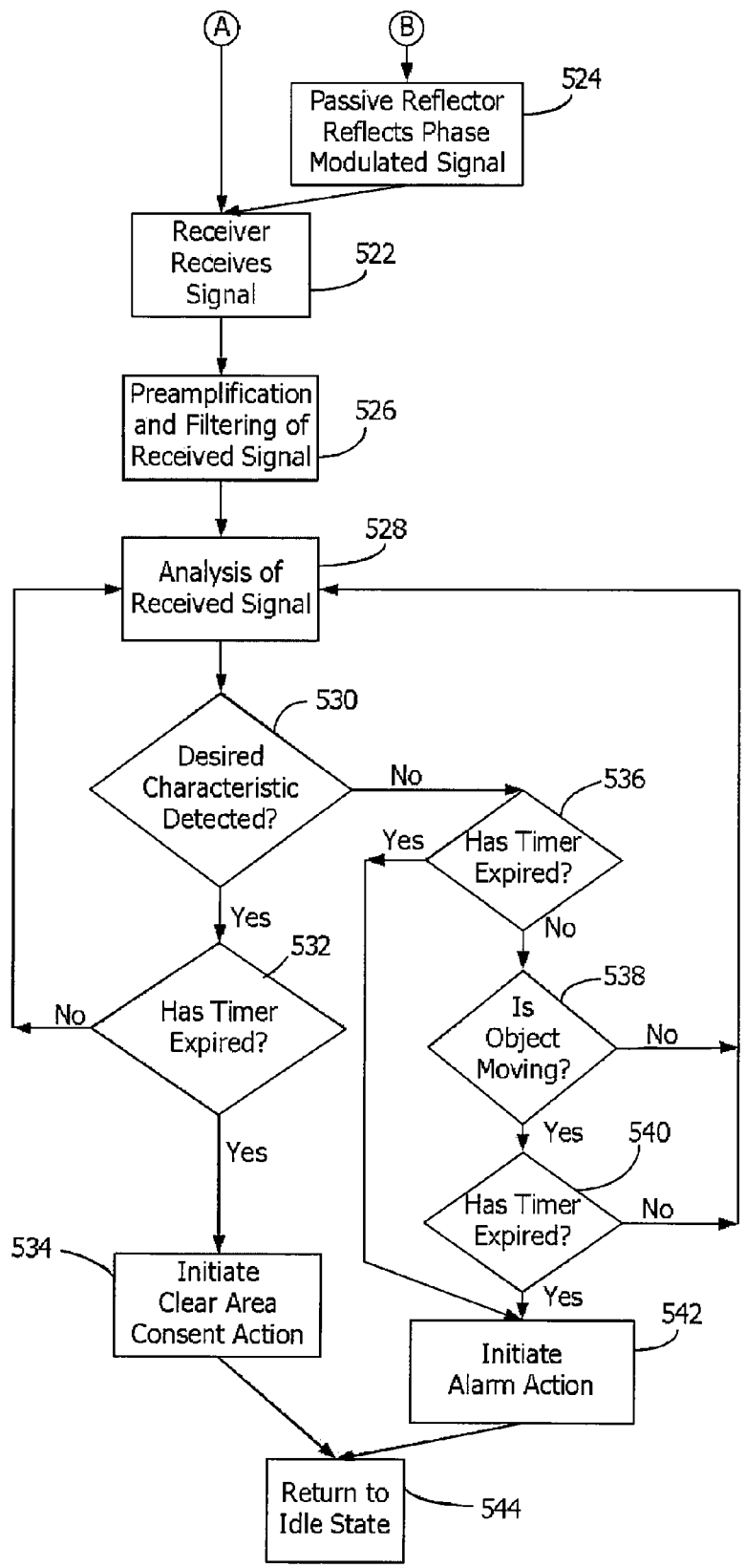

One exemplary embodiment of a method 500 for automatically detecting intrusion in an unauthorized zone, such as detecting the presence of an obstacle located within surveillance zone 334 associated with a railroad grade crossing, is described in FIGS. 5A and 5B, collectively referred to as FIG. 5. The system being in an idle state 502, receives information from GPS system 322 on a scheduled, periodic, or continuous basis. The system awaits an actuating event or a command. In one exemplary embodiment, the system is activated automatically when the gates are closed such as upon receipt of a gates closed signal as at block 506. When gates closed signal 506 is received or an indication is received from a gates closed system 508, processor 316 initiates or sets a timer 510. Additionally, processor 316 initiates the transmission at block 512 of transmitted signal 332 by transmitter 302. In one exemplary embodiment, transmitted signal 332 is received directly by modulating reflector 308 at block 514. In another embodiment, transmitted signal 332 is received by passive reflector 310 and reflected from passive reflector 310 to modulating reflector 308. In either case, modulating reflector 308 receives transmitted signal 332 at block 514. Modulating reflector 308 modulates, using any suitable modulation technique, received signal 338 at block 518 and reflects or transmits the modulated signal 330 at block 520.

Modulated signal 330 is reflected back towards receiver 302B or is transmitted as modulated signal 330A to passive reflector 310 which then reflects modulated signal 330B containing characteristic 340 to receiver 302B. In either case, receiver 302B may receive signal 338 at block 522 which may or may not contain the desired amount of characteristic 340 as introduced by modulating reflector 308. Received signal 338 is processed at block 528 to determine the presence of the desired amount of characteristic 340 within received signal 338 as described above. In one optional embodiment, received signal 338 is first processed by preamplifier and filter 312 at block 526 to obtain a processed signal such as a base band signal.

If desired amount of characteristic 340 is detected at block 530 (as discussed above), processor 316 checks to see if the timer has expired at block 532. If the timer has not expired, processor 316 continues to analyze received signal 338 at block 528. If desired amount of characteristic 340 continues to be detected at block 530 and the timer has expired at block 532, processor 316 initiates a clear zone consent action at block 534. Once the consent action is initiated, the system returns to the idle state at block 544.

If during the analysis at block 528, processor 316 determines that desired amount of characteristic 340 is not present at 530, processor 316 checks the timer to ensure that it has not expired. If the timer has expired at block 536, processor 316 initiates alarm action 328 at block 542. Once alarm action 328 is initiated at block 542, the system returns to the idle state at block 544.

However, if during the analysis at block 528 processor 316 determines that received signal 338 does not include desired amount of characteristic 340 at block 530 and the timer has not expired, processor 316 determines whether the detected object or obstruction is moving within surveillance zone 334 or whether it is stationary at block 538. Processor 316 determines whether the detected object is moving or is stationary within surveillance zone 334 by comparing one received signal 338B with another received signal 338A and determining and analyzing the changes or differences between the two signals. A first received signal 338A may be compared to a second received signal 338B. Changes between first received signal 338A and second received signal 338B may be compared to a threshold, model, or signature to determine whether the object is the same object as detected in the second received signal 338B as the first received signal 338A, and if so, changes may be indicative of movement of the object with surveillance zone 334. For example, where changes in amplitude of the first sideband is lower than the threshold amplitude for a period of time shorter than 2 seconds, processor 316 may determine that the object is moving in surveillance zone 334.

In the alternative, a change in the amplitude peak of the first sideband of received signal 338 by 20 percent may be indicative of a moving object. Processor 316 can make this determination by evaluating received signal 338 over time to identify variations in the amplitude, frequency, or energy of the sidebands in received signal 338. Additionally, two or more received signals 338 may be analyzed in the embodiment where two or more transceivers 302 are utilized to define a single surveillance zone 334 as described above. In such an embodiment, movement may be indicated by analyzing changes in two or more characteristics 340 from the two or more modulated signals 330.

If processor 316 determines that the obstruction or object is moving or in motion within surveillance zone 334, processor 316 checks the timer at block 540. If the timer has expired at block 540, processor 316 initiates an alarm action at block 542. However if the timer has not yet expired at block 540, the system continues to analyze received signal 338 at block 528. If it is determined at block 538 that the object is not moving in surveillance zone 334, the system continues to analyze received signal 338 to determine the modulation characteristic at block 528. This process continues until the timer expires.

Figure 6:
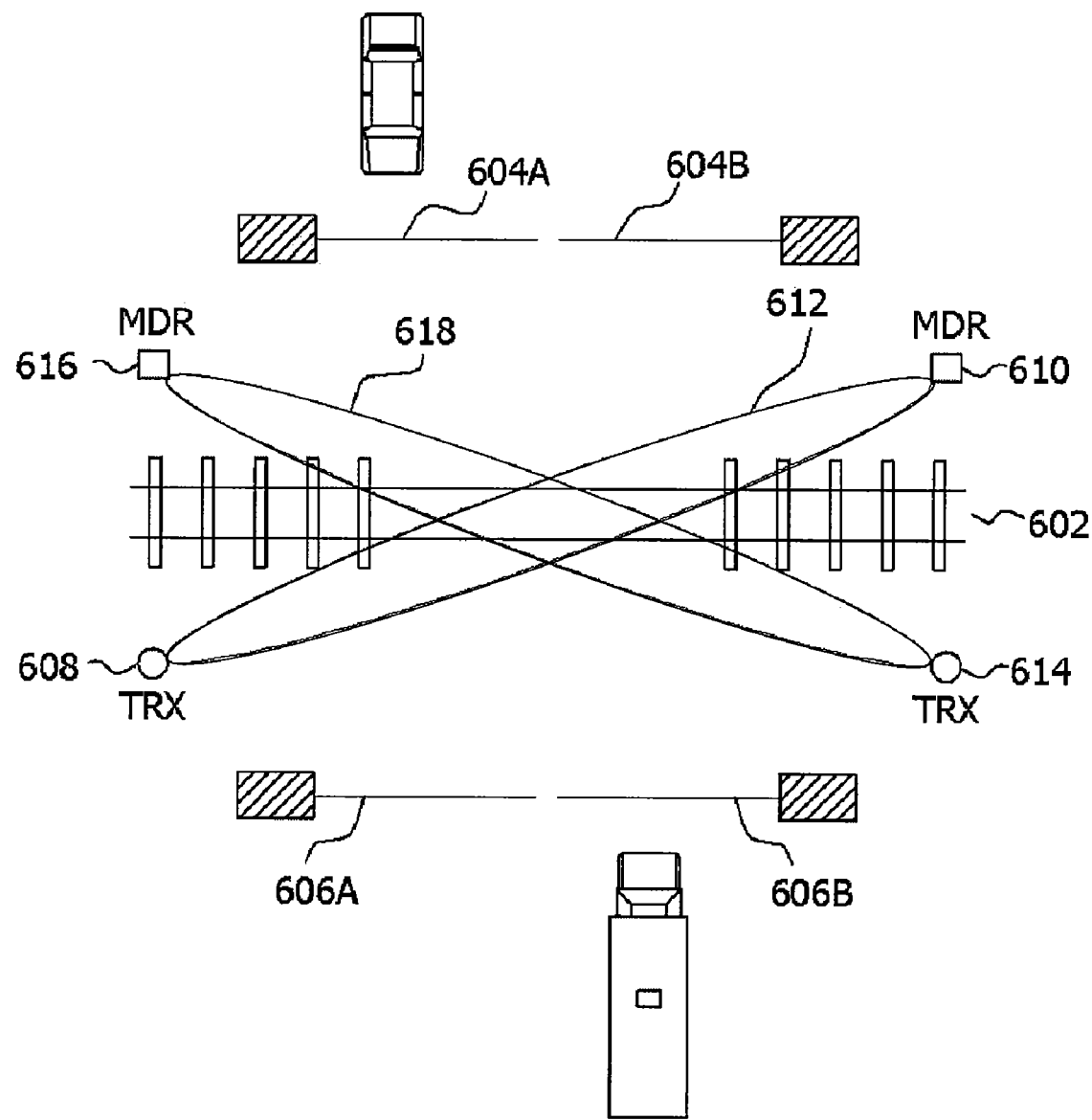
FIG. 6 is an illustration of a system for detecting intrusion in an off-limits zone, such as a railroad crossing having a single track crossing and indicating one exemplary embodiment of the layout of transceivers, modulating reflectors, and an exemplary surveillance zone.

FIG. 6 illustrates an exemplary railroad grade crossing detector system for a single track crossing indicating one embodiment of the layout of the transceivers 302, modulating reflectors 308, and resulting surveillance zones 334. A single track 602 is enclosed by crossing gates 604A and 604B and gates 606A and 606B. A first transceiver 608 transmits a first transmitted signal 332A (not shown) to first modulating reflector 610 and modulating reflector 610 reflects a first modulated signal 330A (not shown) to first transceiver 608 thereby defining a first surveillance zone 612. A second transceiver 614 transmits a second transmitted signal 332B (not shown) to a second modulating reflector 616, wherein second modulating reflector 616 reflects a second modulating signal 330B to second transceiver 614 thereby defining a second surveillance zone 618. In this single track railroad grade crossing, the system-defined surveillance zones 334 are surveillance zones 612 and 618.

Figure 7:
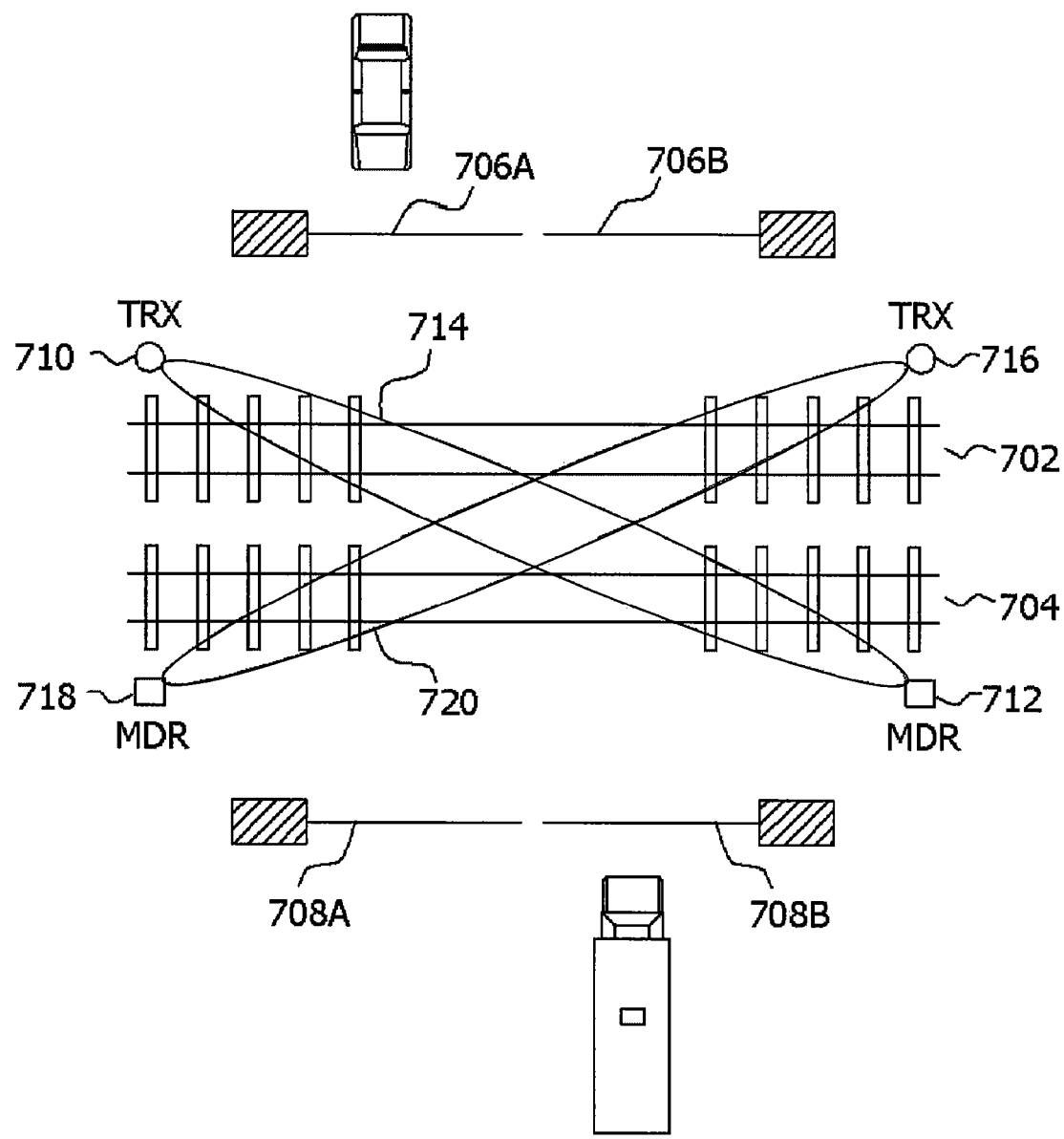
FIG. 7 is an illustration of a system for detecting intrusion in an off-limits zone, such as a railroad crossing having two-track crossing and indicating one exemplary embodiment of the layout of transceivers, modulating reflectors, and an exemplary surveillance zone.

FIG. 7 illustrates an exemplary railroad grade crossing detector system for a two-track crossing indicating one embodiment of the layout of the transceivers 302, modulating reflectors 308, and associated surveillance zones 334. Tracks 702 and 704 are protected by gates 706A and 706B and gates 708A and 708B. A first transceiver 710 transmits a first microwave beam 714 to a modulating reflector 712. A first surveillance zone 334 is defined by beam 714. A second transceiver 716 transmits a second microwave beam 720 to a modulating reflector 718. A second surveillance zone 334 is defined by beam 720. In this two-track railroad grade crossing, the system-defined surveillance zone 334 is the zone defined by 714 and 720.

Figure 8:
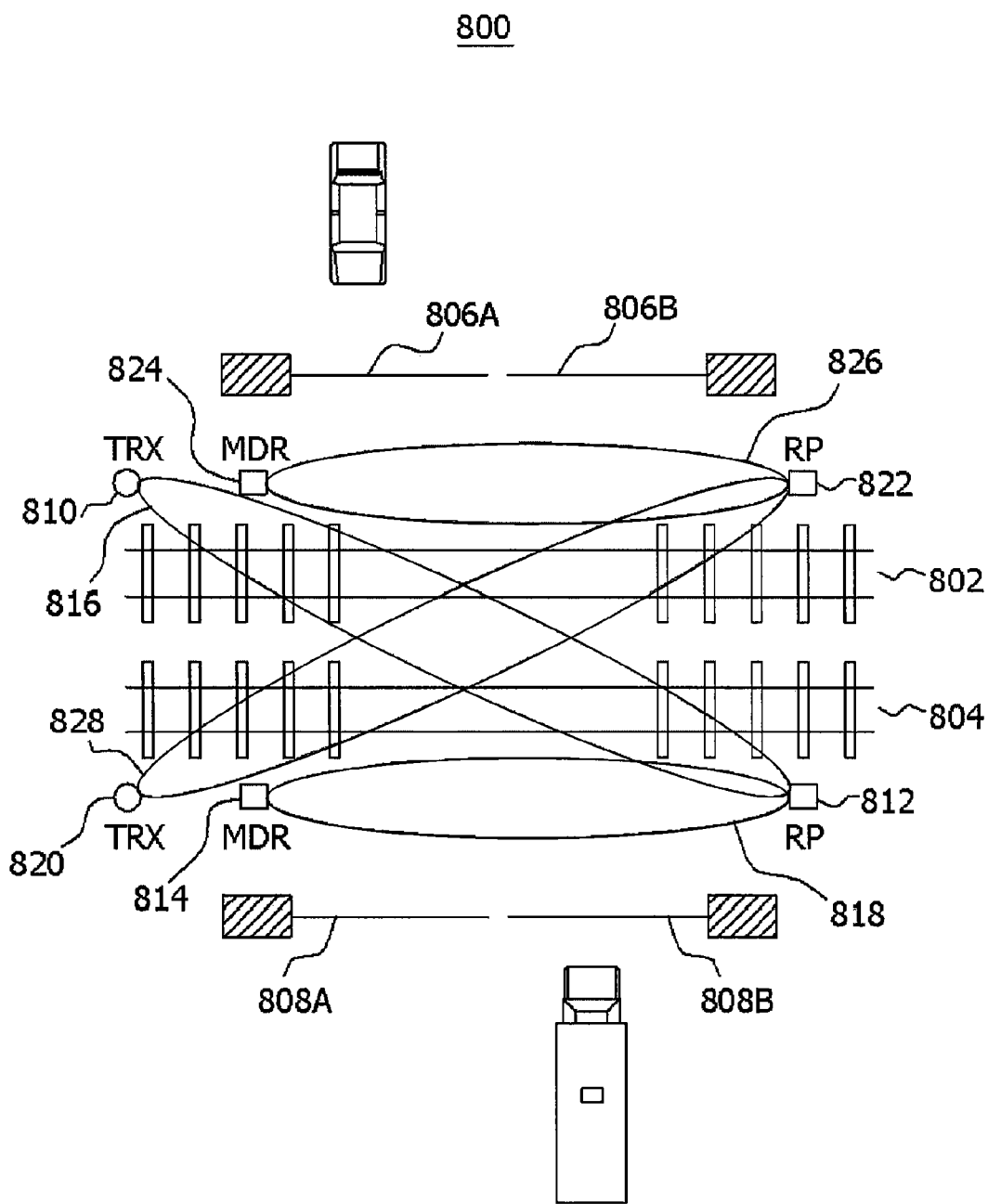
FIG. 8 is an illustration of a system for detecting intrusion in an off-limits zone, such as a railroad crossing having a two-track crossing and indicating one exemplary embodiment of the layout of transceivers, modulating reflectors, passive reflectors, and an exemplary surveillance zone.

FIG. 8 illustrates an exemplary railroad grade crossing detector system for a two-track crossing indicating one embodiment of the layout of the transceivers 302, modulating reflectors 308, passive reflectors 310, and surveillance zone 334. Tracks 802 and 804 are protected by gates 806A and 806B and gates 808A and 808B. A first transceiver 810 transmits a first microwave beam 816 that is received by a passive reflector 812. Passive reflector 812 reflects the received beam 816 to modulating reflector 814 thereby creating a second beam 818. The resulting surveillance zone 334 of the first transceiver is the zone defined by beams 816 and 818. A second transceiver 820 transmits a third microwave beam 828 to a passive reflector 822. A passive reflector 822 reflects the received beam 828 to a modulating reflector 824 thereby creating a fourth beam 826. The resulting surveillance zone 334 of the second transceiver is the zone defined by beam 828 and 826.

Figure 9:
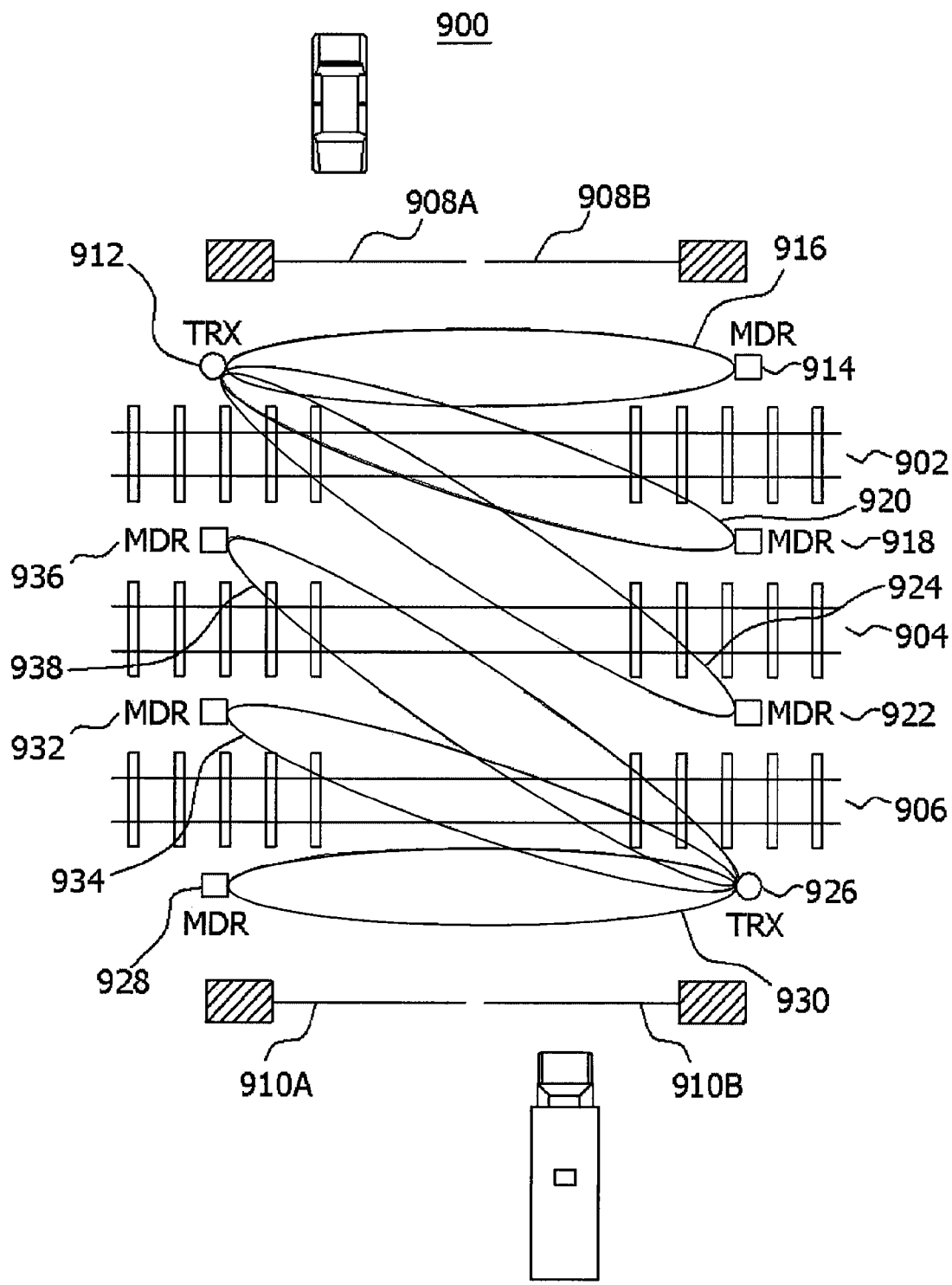
FIG. 9 is an illustration of a system for detecting intrusion in an off-limits zone, such as a railroad crossing having a three track crossing and indicating one exemplary embodiment of the layout of transceivers, multiple modulating reflectors, and an exemplary associated surveillance zone.

FIG. 9 illustrates an exemplary railroad grade crossing detector system for a three track crossing indicating one embodiment of the layout of the transceivers 302, multiple modulating reflectors 308, and surveillance zone 334. Tracks 902, 904 and 906 are protected by gates 908A and 908B and gates 910A and 910B. A first transceiver 912 transmits three microwave beams. A first beam 916 of transceiver 912 is transmitted to a first modulating reflector 914. A second beam 920 of the first transceiver 912 is transmitted to a second modulating reflector 918. A third beam 924 of the first transceiver 912 is transmitted to a third modulating reflector 922. As such, surveillance zone 334 of the first transceiver 912 is the zone defined by beams 916, 920 and 924. In a similar manner, a second transceiver 926 transmits three microwave beams. A first beam 930 of transceiver 926 is transmitted to a first modulating reflector 928. A second beam 934 of the second transceiver 926 is transmitted to a second modulating reflector 932. A third beam 938 of the second transceiver 926 is transmitted to a third modulating reflector 936. As such, the surveillance zone 334 of the second transceiver 926 is the zone defined by beams 930, 934 and 938.

In the embodiment as shown in FIG. 9, transceivers 912 and 926 each transmit more than one transmitted signal 332, each such transmitted signal 332 being directed to a separate modulating reflector 308. Each modulating reflector 308 is configured to uniquely modulate transmitted signal 332 by introducing unique characteristics 340 to generate the associated unique modulated signal 330 based on the received transmitted signal 332 as received by each modulating reflector 308. Receiver 302B receives signals from one or more modulating reflectors 308. Receiver 302B, preamplifier 312, demodulator 314, and processor 316 are configured to identify each of the unique modulated signals 330 and characteristics 340 as described above to determine the unique characteristics 340 in each received modulated signal 330 and therefore the presence or absence of an object. Each of these are determined separately in order to separately determine whether or not the desired amount of each and every characteristic 340 has been received, thereby determining the presence or absence of an obstacle for each and every surveillance zone 916, 920, 924, 930, 934 and 938. In this exemplary embodiment, the system and method operate to detect the amount of each and every characteristic 340 in each modulated signal 330 for the particular configuration and embodiment. In such an embodiment, the method and processes defined in FIG. 5 are performed for each and every separate modulated signal.

Figure 10:
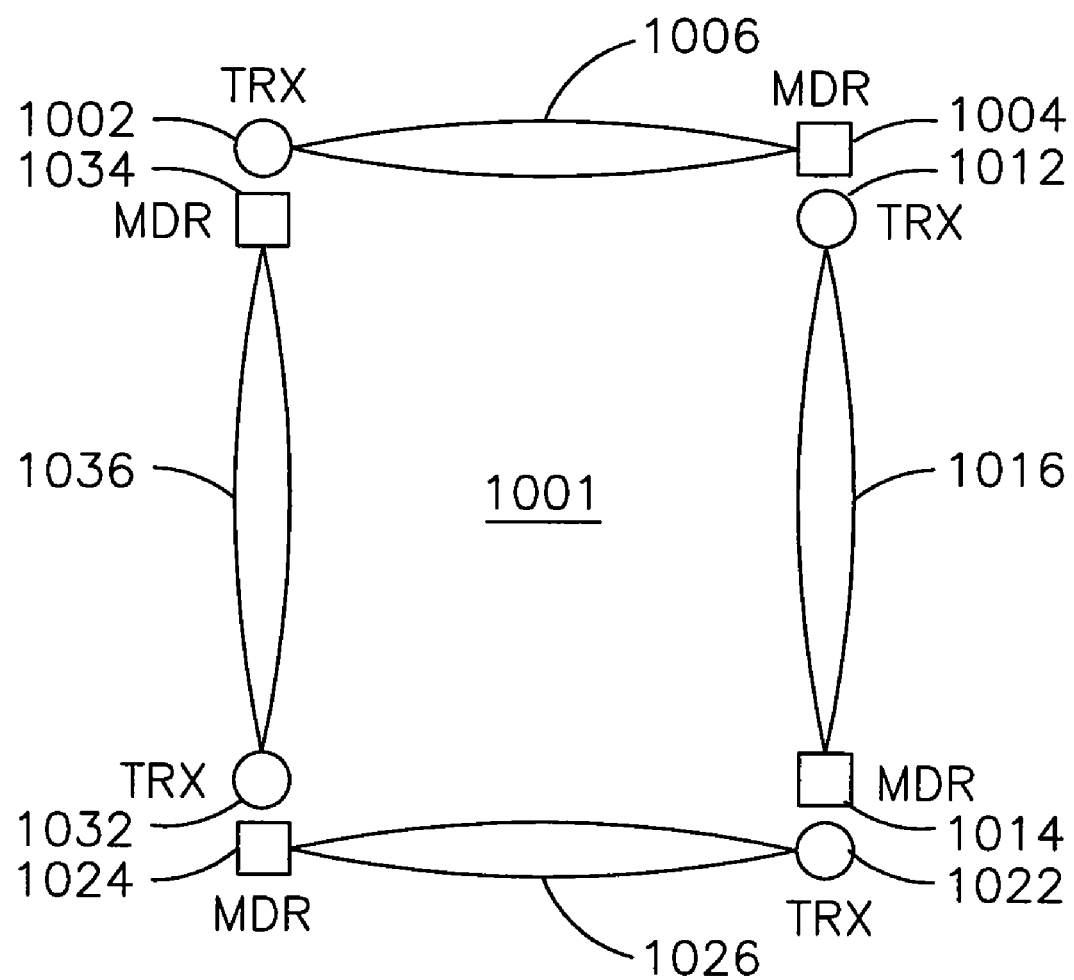
FIG. 10 is an illustration of a system for detecting intrusion in an off-limits zone, such as may be defined by a perimeter and indicating one exemplary embodiment of the layout of transceivers, modulating reflectors, and an exemplary surveillance perimeter.

FIG. 10 illustrates is an illustration of a system for detecting intrusion in an off-limits zone 1001, such as may be defined by a perimeter. FIG. 10 indicates one exemplary embodiment of the layout of the transceivers, modulating reflectors, and a resulting surveillance perimeter. A first transceiver 1002 transmits a first transmitted signal (not shown) to a first modulating reflector 1004 and modulating reflector 1004 reflects a first modulated signal (not shown) to first transceiver 1002 thereby defining a first surveillance perimeter section 1006. A second transceiver 1012 transmits a second transmitted signal (not shown) to a second modulating reflector 1014, wherein second modulating reflector 1014 reflects a second modulating signal to second transceiver 1012 thereby defining a second surveillance perimeter section 1016. A third transceiver 1022 transmits a third transmitted signal (not shown) to a third modulating reflector 1024 and modulating reflector 1024 reflects a third modulated signal (not shown) to third transceiver 1022 thereby defining a third surveillance perimeter section 1026. A fourth transceiver 1032 transmits a fourth transmitted signal (not shown) to a fourth modulating reflector 1034 and modulating reflector 1034 reflects a fourth modulated signal (not shown) to fourth transceiver 1032 thereby defining a fourth surveillance perimeter section 1036. It will be appreciated that this layout may be used for many surveillance applications where an off-limits area may be defined by a perimeter, such as may be the case in airports, seaports, bridges, tunnels, industrial sites, military sites, housing complexes, etc. It will be appreciated that the off-limits area need not be fully circumscribed by a closed perimeter. Moreover, the configuration shown in FIG. 10 is merely illustrative since the shape of the off-limits area may take any geometrical configuration. Also the number the number of transceivers, modulating reflectors, and passive reflectors, if any, will vary depending of the requirements of any given application.

In one example embodiment, a microwave intrusion barrier, such as the exemplary barrier 1106 depicted in FIG. 10, may have a length in the order of 80 meters and may overlap an adjacent microwave barrier by approximately 20 meters. It will be appreciated that perimeter length may vary depending on any given application, such as airport dimensions. For example, perimeter length can extend from a few kilometers to longer lengths for larger airports.

A difference between crossing applications (e.g., railroad crossings, runway crossings, highway crossings, etc.) and perimeter protection, vehicle ground movement controlling, and runway incursion protection applications, e.g., airport, military bases, etc., is that in the such applications, the target to be detected may be a moving (e.g., transient) target, such as a passing intruder, a vehicle moving into or out of a monitored area, or an aircraft moving into a monitored runway zone, whereas in the railway crossing the issue is whether the target remains at the crossing. For example, in railroad crossing application, the detection system may be configured to turn on the microwave barriers just after closure of the gates for a few seconds, such as about 10 seconds, and then to compare the signal level, such as a signal amplitude level, relative to a fixed threshold detection level. For example, the threshold detection level may be chosen to determine a "free area", e.g., an unobstructed area versus an obstructed area. By way of comparison, in a perimeter application, the detection system may be configured to keep the microwave barriers continuously turned on, and may be further configured with a variable threshold detection level to provide improved intrusion detection in perimeter applications.

Figure 11:
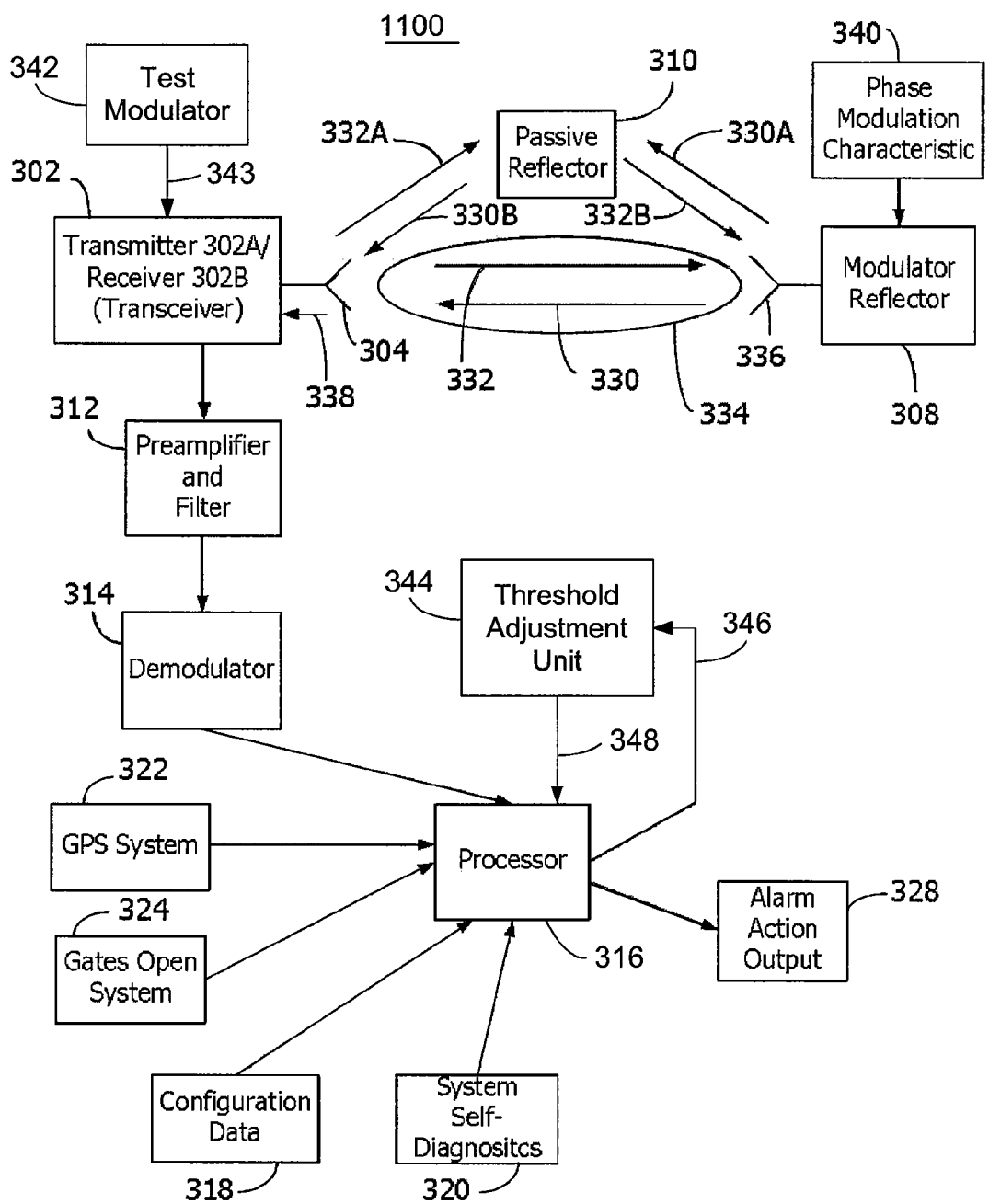
FIG. 11 is a schematic illustrating a microwave detection system for automatically adjusting a detection threshold for detecting intrusion in an off-limits zone in accordance with aspects of the invention.

FIG. 11 is a schematic illustrating a microwave detection system 1100 for automatically varying a detection threshold for detecting intrusion in an off-limits zone in accordance with aspects of the invention. The system 1100 may include elements used in the system 300 depicted in FIG. 3. For example, the system 1100 of FIG. 11 may include a microwave transmitter/receiver 302 and a modulating reflector 308. Transceiver 302 provides received signal 338 to a preamplifier 312 that provides a processed signal to a demodulator 314. Demodulator 314 provides a demodulated received signal 338 to a processor 316 for signal analysis.

Transmitted signal 332 is transmitted by transmitter 302A and received by one or more modulating reflectors (MDR) 308. Modulating reflector 308 receives transmitted signal 332 and introduces a characteristic to create modulated signal 330. Modulated signal 330 is transmitted or reflected by modulating reflector 308 and is received by receiver 302B. Transmitted signal 332 and modulated signal 330 define surveillance zone 334 such that the detection of an obstruction in surveillance zone 334 is a function of the disruption of either the transmitted signal 332 or modulated signal 330 as described previously. For example, if an amplitude peak of a sideband of a received signal is below a predefined value or fixed threshold, this condition may be indicative of an intrusion in the protected perimeter.

In one example embodiment, basic principles of operation of the detection system 1100 may be as follows: the modulation imparted by the modulating reflector 308 results in uniquely identifiable characteristics in the modulated signal. Processing of these characteristics allows detecting the presence (or absence) of intruders. For example, phase modulation may create sidebands in the modulation signal that are not present in the transmitted signal, e.g., the signal originally transmitted by the transceiver 302. The modulated signal from the modulating reflector 308 is received and demodulated by a demodulator in the transceiver 302 and processed in order to quantify such characteristics, as introduced by the modulating reflector 308 (and further affected when an intruder is in the monitored area). This quantifying, such as measuring a peak amplitude level of one or more characteristics, allows detecting the presence (or absence) of intruders in the surveillance area. For example, if the received signal has a sideband with amplitude peak or energy level that exceeds a predefined value, the processor 316 would determine that an intruder is not present in the surveillance area, whereas if the amplitude peak or energy level that is below a predefined value, the processor 316 may determine that an intruder is present in the surveillance area.

In an aspect of the invention, the system 1100 may further include a threshold adjustment unit 344 coupled to the processor 316 for automatically adjusting a detection threshold, for example, responsive to a change in a gain of the system 1100. This variable threshold may be used to achieve a higher sensitivity of the microwave barriers with respect to relatively faster signal variations, such as an intruder moving into a monitored perimeter. Relatively faster signal variations may include signal variations occurring faster compared to typical slower occurring signal variations, such as may occur due to environmental condition changes, or due to vegetation growth in a monitored perimeter, etc. In one example, the variable threshold may be based on a received signal amplitude level obtained upon applying a "smoothing" algorithm (e.g., a low pass filter) to the microwave barrier signal, and subtracting a configurable level that compensates for slow signal variations in the received signal to generate the variable threshold. For example, when a level of the barrier signal is below this variable threshold (and/or below a fixed threshold), the detection system may be configured to generate an "intrusion alarm" message indicating which barrier has detected an intrusion. This may be used to turn on a ringer and/or an appropriately located video camera, such as may be part of an airport video-surveillance system. In this manner, intrusion images can be displayed. This information can also be used to display the intrusion location on a map of the airport, indicating which microwave barrier has detected the intrusion. Accordingly, the detection system 1100 may be configured to interact with different equipment (such as visual monitoring equipment) in order to focus on a given perimeter segment once an initial alarm has been triggered.

System gain generally refers to an amplitude gain of the electronic chain comprising the system 1100. In a perimeter application, drift in the system gain may occur due to factors such as growth of vegetation, (e.g., grass), temperature variation, water buildup on a front surface of a sensor housing, etc. For gain variations resulting from water build-up, a water calibration device may be provided that allows adjusting an antenna distance from a front surface of the sensor housing containing the antenna 304, 336. It has been observed that if the antenna, such as antenna 304 and/or 336, is placed at a suitable distance from the front surface of the sensor housing, an influence of a water collecting on this surface becomes negligible. For example, this distance may be determined by measuring a signal level while varying the antenna's distance from the front surface, placing the antenna in relation to the front surface to maximize the signal level, and then moving the antenna in the direction of the front surface of the sensor until measuring a predefined lowering of the signal level, such as approximately 10% under the maximum signal level. When using certain carrier frequencies, such as carrier frequencies in the range of 10 GHz, the influence of atmospheric conditions, such as rain or fog, on the system gain is negligible.

Figure 12:
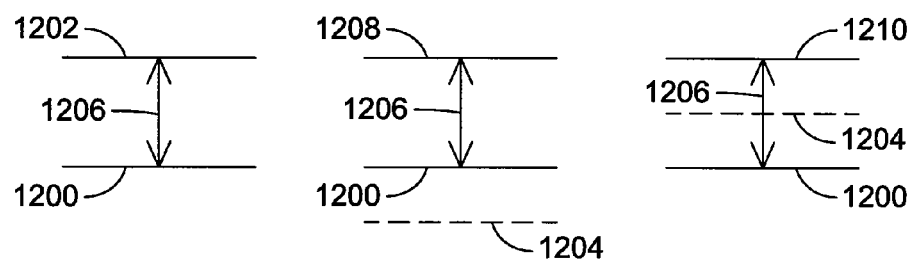
FIG. 12 depicts example variable thresholds for use in the system of FIG. 11.
Figure 13:
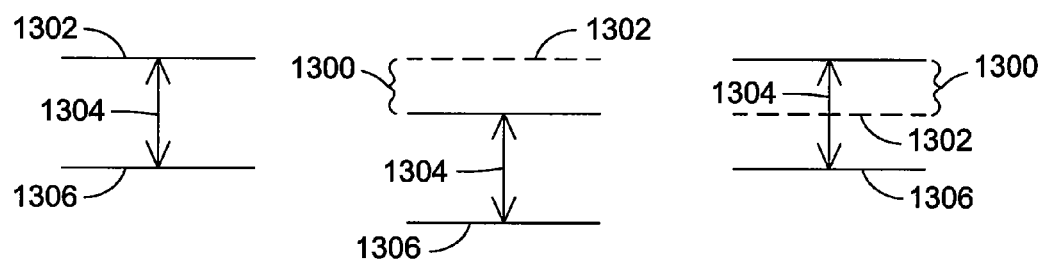
FIG. 13 depicts example variable thresholds with respect to fixed thresholds for use in the system of FIG. 11.

An intrusion in the perimeter system 1100 generally causes a certain amount of decrease of the barrier signal level. Conversely, a gain increase of the system 1100 causes an increase in the barrier signal level that may result in a reduced sensitivity of the system 1100 for detecting an intrusion when the detection threshold is fixed at a predetermined value. For example, a decrease in the barrier signal level as a result of an intrusion may result in a signal level drop below a predefined fixed threshold, but may not result in a signal level drop sufficient to go below the predefined fixed threshold when the system gain has increased, possibly resulting in missing detection of an intruder. A variable threshold that tracks a varying gain of the system is more resistant to increased gain effects. In an example embodiment depicted in FIG. 12, the variable threshold 1200 may be varied so that a desired difference 1206 between the barrier signal level 1202 and the variable threshold 1200 is maintained responsive to the gain of the system. For example, the variable threshold 1200 may be raised from a prior level indicated by dotted line 1204 responsive to a gain increase level 1208, and lowered responsive to a gain decrease level 1210 to maintain a desired difference 1206 between the signal level and the detection threshold. In another embodiment depicted in FIG. 13, a variable threshold 1300 may be used to subtract from or add to a signal level 1302 that has increased or decreased, respectively, to maintain a desired difference 1304 between the signal level 1302 and a fixed detection threshold 1306.

Returning to FIG. 11, a test modulator 342 may be used to test the electronic gain of the system 1100. In one example embodiment, the test modulator 342 may be periodically used during a normal operational mode of the detection system 1100. The test modulator 342 is helpful to detect a drift of the gain that could compromise the system detection capability. As noted above, an increase in the value of the gain would lead to a decrease of the detection sensitivity of the system. In one embodiment, the test modulator 342 may be configured to inject a reference signal 343 into the system 1100, such as into the receiver 302B. The processor 316 uses the level of the reference signal 343 at the demodulator output to measure the electronic gain of the system 1100. The processor 316 may provide a gain measurement signal 346 indicative of the measured gain of the system 1100 to the threshold adjustment unit 344. Based on the gain measurement signal 346, the threshold adjustment unit 344 may adjust a variable threshold to compensate for a change in the gain of the system 1100. The threshold adjustment unit 344 may provide an adjusted variable threshold signal to the processor 316 for use in identifying an intrusion based on a signal level received via the demodulator 314. For example, the processor 316 may compare the received signal level to the variable threshold to see if the signal level is below the variable threshold or may modify the signal level by the variable threshed and then compare the modified signal to a fixed threshold to determine if the modified signal level is below a fixed detection threshold, indicating an intrusion.

Those skilled in the art will note that the order of execution or performance of the methods illustrated and described herein is not essential, unless otherwise specified. That is, it is contemplated that aspects or steps of the methods may be performed in any order, unless otherwise specified, and that the methods may include more or less or alternative aspects or steps than those disclosed herein.

As various changes could be made in the above exemplary constructions and methods without departing from the scope of the invention, it is intended that all matter contained in the above description or shown in the accompanying drawings shall be interpreted as illustrative and not in a limiting sense. For example, the system and method may be used for monitoring runways of an airport to track and/or identify planes or other vehicles moving into and out of monitored portions of runways to aid in prevention of accidents resulting from planes or other vehicles intruding onto the monitored portions. In another example embodiment, the system may be used to track movement of vehicles as they enter or leave monitored areas.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

What is claimed is:

1. A microwave detection system comprising:
    a transmitter configured to transmit a signal along a path to detect an intruder to a monitored zone;
    a modulating reflector configured to receive the transmitted signal to generate a modulated signal having a characteristic introduced by said modulating reflector, said modulating reflector configured to transmit the modulated signal;
    a receiver located to receive the modulated signal;
    an adaptive threshold adjustment unit configured for providing a variable detection threshold responsive to a change in a gain of the system; and
    a processor configured for processing the modulated signal provided by the receiver and configured for measuring a characteristic in the processed modulated signal with respect to the variable detection threshold provided by the adaptive threshold adjustment unit.

2. The system of claim 1, further comprising a test modulator configured for injecting a test signal into the receiver to allow determining the gain of the system.

3. The system of claim 2, wherein the processor is further configured for measuring the test signal to determine the gain of the system.

4. The system of claim 3, wherein the processor is further configured for providing a gain measurement signal indicative of the gain of the system to the adaptive threshold adjustment unit.

5. The system of claim 4, wherein the adaptive threshold adjustment unit is further configured for providing a threshold adjustment signal to the processor indicative of the variable detection threshold.

6. The system of claim 5, wherein the processor is further configured for subtracting the variable detection threshold from the received modulated signal when the gain of the system decreases.

7. The system of claim 5, wherein the processor is further configured for adding the variable detection threshold from the received modulated signal when the gain of the system increases.

8. The system of claim 1, wherein the adaptive threshold adjustment unit is further configured for increasing the variable detection threshold when the gain of the system increases.

9. The system of claim 1, wherein the adaptive threshold adjustment unit is further configured for decreasing the variable detection threshold when the gain of the system decreases.

10. The system of claim 1, wherein the monitored zone is an off-limits zone and the system is configured for automatically detecting intrusion in the off-limits zone.

11. The system of claim 1, wherein the monitored zone is a runway of an airport and the system is configured for automatically detecting incursion of an object in the runway.

12. The system of claim 1, wherein the system is configured for automatically tracking ground movements of an object in one or more a monitored zones.

13. A method for automatically detecting intrusion in a monitored zone, said method comprising:
- transmitting a microwave signal along a path to detect an intruder to an off-limits zone;
- receiving the microwave signal at a modulating reflector;
- modulating the signal received by the modulating reflector to generate a modulating signal having a characteristic;
- transmitting the modulated signal to be received by a receiver;
- adjusting a detection threshold responsive to a gain of the system; and
- processing the received modulated signal to measure the characteristic in the received modulated signal with respect to the detection threshold.

14. The method of claim 13, further comprising determining a gain of the system.

15. The method of claim 14, wherein when the determined gain indicates an increased gain compared to a prior determined gain, increasing the detection threshold.

16. The method of claim 14, wherein when the determined gain indicates a decreased gain compared to a prior determined gain, decreasing the detection threshold.

17. The method of claim 14, wherein adjusting a detection threshold responsive to the determined gain comprises subtracting a signal level amount from the received modulated signal corresponding to an increase in gain of the system.

18. The method of claim 14, wherein adjusting a detection threshold responsive to the determined gain comprises adding a signal level amount to the received modulated signal corresponding to a decrease in gain of the system.

19. The method of claim 13, further comprising initiating an action as a function of the measured characteristic with respect to the detection level threshold.

20. The method of claim 19, wherein the action comprises generating an intrusion alarm indicating that an intrusion in the monitored zone has been detected.

21. The method of claim 13, wherein the monitored zone is an off-limits zone.

22. The method of claim 13, wherein the monitored zone is a runway of an airport, the method further comprising automatically detecting incursion of an object in the runway.

23. The method of claim 13, further comprising automatically tracking ground movements of an object in one or more a monitored zones responsive to detection of the object entering or leaving the monitored zone.

* * * * *